(12) United States Patent
Okafuji et al.

(10) Patent No.: US 9,017,143 B2
(45) Date of Patent: Apr. 28, 2015

(54) METHOD FOR MANUFACTURING ELECTRONIC GRADE SYNTHETIC QUARTZ GLASS SUBSTRATE

(75) Inventors: Daiyu Okafuji, Joetsu (JP); Masaki Takeuchi, Joetsu (JP); Hiroyuki Yamazaki, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 468 days.

(21) Appl. No.: 13/170,573

(22) Filed: Jun. 28, 2011

(65) Prior Publication Data
US 2011/0318995 A1 Dec. 29, 2011

(30) Foreign Application Priority Data
Jun. 28, 2010 (JP) .................................. 2010-146507

(51) Int. Cl.
*B24B 7/24* (2006.01)
*C03C 15/02* (2006.01)
*B24B 19/03* (2006.01)
*B24B 7/22* (2006.01)

(52) U.S. Cl.
CPC ................. *B24B 7/241* (2013.01); *C03C 15/02* (2013.01); *B24B 19/03* (2013.01); *B24B 7/228* (2013.01)

(58) Field of Classification Search
CPC ............ B24B 7/24; B24B 7/241; B24B 7/242
USPC ......... 216/52, 53; 438/42, 43; 451/24, 27, 41, 451/44, 51, 57, 58, 61
See application file for complete search history.

(56) References Cited

U.S. PATENT DOCUMENTS

| 4,029,531 | A | * | 6/1977 | Marinelli ....................... 438/749 |
| 4,106,915 | A | * | 8/1978 | Kagawa et al. .................. 51/296 |
| 4,170,851 | A | * | 10/1979 | Enos ................................. 451/5 |
| 4,928,435 | A | * | 5/1990 | Masaki et al. ................. 451/159 |
| 6,113,464 | A | * | 9/2000 | Ohmori et al. .................. 451/41 |
| 6,162,702 | A | * | 12/2000 | Morcom et al. .............. 438/459 |
| 6,413,682 | B1 | | 7/2002 | Shibano et al. |
| 7,115,485 | B2 | * | 10/2006 | Priewasser ..................... 438/464 |
| 7,210,984 | B2 | * | 5/2007 | Taylor ............................. 451/44 |
| 7,420,263 | B2 | * | 9/2008 | Park et al. ..................... 257/620 |
| 7,559,826 | B2 | * | 7/2009 | Sekiya ............................ 451/41 |

(Continued)

FOREIGN PATENT DOCUMENTS

| JP | 03-054569 A | 3/1991 |
| JP | 2000-330263 A | 11/2000 |

(Continued)

OTHER PUBLICATIONS

Japanese Office Action dated Feb. 25, 2014, issued in corresponding Japanese application No. 2011-132878 (3 pages).

(Continued)

*Primary Examiner* — Lee D Wilson
*Assistant Examiner* — Tyrone V Hall, Jr.
(74) *Attorney, Agent, or Firm* — Westerman, Hattori, Daniels & Adrian, LLP

(57) ABSTRACT

An electronic grade synthetic quartz glass substrate is manufactured by machining a synthetic quartz glass substrate to form a recess, channel or step and polishing the bottom and side surfaces of the recess, channel or step to mirror finish by a working portion of a rotary polishing tool while keeping the working portion in contact with the bottom and side surfaces under independent constant pressures.

13 Claims, 3 Drawing Sheets

(56) References Cited

U.S. PATENT DOCUMENTS

| | | | |
|---|---|---|---|
| 8,292,690 B2* | 10/2012 | Seddon | 451/5 |
| 2002/0046580 A1* | 4/2002 | Matsuo et al. | 65/397 |
| 2005/0186691 A1* | 8/2005 | Koike et al. | 438/14 |
| 2006/0223427 A1* | 10/2006 | Tsumuraya et al. | 451/61 |
| 2006/0244096 A1* | 11/2006 | Sekiya | 257/510 |
| 2009/0038743 A1* | 2/2009 | Suzuki et al. | 156/154 |
| 2009/0102020 A1* | 4/2009 | Sugawara et al. | 257/618 |
| 2009/0104853 A1* | 4/2009 | Suzuki et al. | 451/44 |
| 2009/0186563 A1* | 7/2009 | Takahashi et al. | 451/57 |
| 2009/0233529 A1 | 9/2009 | Ueda | |
| 2010/0059862 A1 | 3/2010 | Seddon | |
| 2010/0291257 A1 | 11/2010 | Resnick et al. | |

FOREIGN PATENT DOCUMENTS

| | | |
|---|---|---|
| JP | 2001-097734 A | 4/2001 |
| JP | 2008-103512 A | 5/2008 |
| JP | 2008-105171 A | 5/2008 |
| JP | 2009-536591 A | 10/2009 |

OTHER PUBLICATIONS

Extended European Search Report dated Oct. 16, 2014, issued in corresponding European Patent Application No. 11171431.7 (5 pages).

* cited by examiner

METHOD FOR MANUFACTURING ELECTRONIC GRADE SYNTHETIC QUARTZ GLASS SUBSTRATE

CROSS-REFERENCE TO RELATED APPLICATION

This non-provisional application claims priority under 35 U.S.C. §119(a) on Patent Application No. 2010-146507 filed in Japan on Jun. 28, 2010, the entire contents of which are hereby incorporated by reference.

TECHNICAL FIELD

This invention relates to a method for manufacturing electronic grade synthetic quartz glass substrates having a recess, channel or step and more particularly, a method for manufacturing synthetic quartz glass substrates for use in the advanced applications of semiconductor-related electronic materials, typically as photomasks, exposure tool components, reticles and nanoimprint molds.

BACKGROUND ART

The quality of synthetic quartz glass substrates is evaluated in terms of the size and population of defects on the substrate, flatness, surface roughness, photochemical stability of material, and surface chemical stability. The trend toward higher accuracy of the design rule poses ever-tightening requirements on these factors.

Photomask substrates used in the fabrication of microelectronic devices and liquid crystal displays must have a high accuracy of shape or topography. If a substrate has a poor accuracy of shape or a certain degree of distortion, exposure through the mask entails a focal shift on a silicon wafer to aggravate pattern uniformity, failing to form a fine feature pattern. In the lithography using ArF laser light source of 193 nm wavelength which is the current mainstream of microelectronic lithography and the EUV lithography using a light source of 13.5 nm wavelength in the soft x-ray wavelength range on which development efforts are made as the next generation lithography, glass substrates for photomasks and reflection masks are required to have a high level of topographical factors including flatness, parallelism, and contour tolerance (as to flatness, see JP-A 2008-103512). The same applies to photomask substrates on the array side of TFT liquid crystal panels and photomask substrates for color filters.

Research works have also been made on the nanoimprint lithography (NIL) which is a low cost, simple, high resolution process as compared with the conventional exposure processes. The NIL also needs a substrate having a high accuracy of shape as the imprint mold. The NIL is a technique of imprinting a nano-structured pattern to a resin for pattern transfer. The resolution of the pattern to be transferred depends on the resolution of nano-structures on the mold. Then the substrate on which a fine feature pattern is formed is required to have a high accuracy of shape (see JP-A H03-54569).

Besides, the synthetic quartz glass members to be assembled in exposure tools and various other equipment used in the processes of manufacturing microelectronic and display components are also required to have a high purity and accuracy.

CITATION LIST

Patent Document 1: JP-A 2008-103512
Patent Document 2: JP-A H03-54569
Patent Document 3: JP-A 2009-536591

SUMMARY OF INVENTION

An object of the invention is to provide a method for manufacturing an electronic grade synthetic quartz glass substrate having a recess, channel or step having bottom and side surfaces in a relatively simple manner, in which the bottom and side surfaces of the recess, channel or step are mirror finished, and shape factors including size, bottom wall thickness, and parallelism are consistently controlled at a high accuracy so that the substrate may have a high strength at the recess, channel or step.

The inventors have found that the above problems are overcome by machining a synthetic quartz glass substrate to form a recess, channel or step therein and polishing the bottom and side surfaces of the recess, channel or step to mirror finish by a rotary polishing tool while keeping the tool in contact with the bottom and side surfaces under independent constant pressures. The polishing step is effective for removing the residual stress or residual strain by machining. Now that the bottom and side surfaces of the recess, channel or step are polished to mirror finish, the recess, channel or step is resistant to breakage even when repetitive loads and hence, substantial stresses are applied thereto.

It is assumed that a substrate has a pair of front and back major surfaces, and a recess, channel or step formed in at least one surface has bottom and side surfaces or walls. On use of the substrate having a recess, channel or step, the photomask or nanoimprint working process is applied to the front surface. The distance between the bottom surface of the recess, channel or step formed in one surface of the substrate and another surface of the substrate (also referred to as bottom wall thickness) may range from 0.05 to 80 mm, more preferably 0.05 to 11 mm, and correspond to 5 to 50%, more preferably 10 to 30% of the substrate thickness. The bottom wall thickness desirably has a low value within the range. In the prior art, such a recess, channel or step is not subjected to mirror finishing, or the substrate is used as machined because the recess, channel or step is difficult to mirror finish. However, the state of a recess, channel or step as machined gives rise to the problem that the substrate can be relatively readily broken when repetitive loads are applied thereto. Thus the distance between the substrate front surface and the bottom surface of the recess or channel or between the substrate back surface and the bottom surface of the step is relatively long (i.e., bottom wall is relatively thick) in the prior art.

Quite unexpectedly, the strength of a recess, channel or step-defining portion is increased by polishing the bottom and side surfaces of the recess, channel or step to mirror finish. Even when the distance between the substrate front or back surface and the bottom surface of the recess, channel or step is relatively short (i.e., bottom wall is relatively thin), the substrate is fully resistant to breakage upon repetitive application of substantial loads, that is, withstands substantial stresses.

The invention provides a method for manufacturing an electronic grade synthetic quartz glass substrate having front and back surfaces, comprising the steps of:

machining at least one surface of a synthetic quartz glass substrate to form a recess, channel or step having bottom and side surfaces, and polishing the bottom and side surfaces of the recess, channel or step to mirror finish by a working portion of a rotary polishing tool while keeping the working portion in contact with the bottom and side surfaces under independent constant pressures.

In a preferred embodiment, the mirror finish polishing step includes keeping the working portion in contact with the bottom and side surfaces of the recess, channel or step under independent constant pressures in a range of 1 to 1,000,000 Pa.

Preferably, in the mirror finish polishing step, the working portion of the rotary polishing tool is kept in concurrent contact with the bottom and side surfaces under independent pressures.

Preferably, in the mirror finish polishing step, the rotary polishing tool and the substrate are relatively moved such that the working portion may follow the profile of the recess, channel or step in the substrate. More preferably in the mirror finish polishing step, the rotary polishing tool is rotated about the recess or a substrate-holding platform is rotated such that the working portion may follow the profile of the recess, channel or step in the substrate. More preferably, in the mirror finish polishing step, the rotary polishing tool or a substrate-holding platform is moved along at least one straight axis such that the working portion may follow the profile of the recess, channel or step in the substrate.

In a preferred embodiment, the substrate has a thickness of 0.1 to 300 mm, and the distance between the bottom surface of the recess, channel or step in one surface of the substrate and another surface of the substrate is in a range of 0.05 to 80 mm and corresponds to 5 to 50% of the substrate thickness.

In a preferred embodiment, the substrate on its front and back surfaces has a flatness of 0.01 to 30 μm and a parallelism of 0.1 to 50 μm prior to the machining step, the bottom and side surfaces of the recess, channel or step have a surface roughness Ra of 2 to 500 nm prior to the mirror finish polishing step, and the bottom surface of the recess, channel or step has a flatness of 0.01 to 40 μm and a parallelism of up to 100 μm and the bottom and side surfaces of the recess, channel or step have a surface roughness Ra of up to 1 nm, following the mirror finish polishing step.

Typically the glass substrate is used as a photomask, exposure tool component, reticle or nanoimprint component.

Advantageous Effects of Invention

In the manufacture of an electronic grade synthetic quartz glass substrate having a recess, channel or step, for example, a synthetic quartz glass substrate for use as a photomask substrate in the photolithography or a mold substrate in the nanoimprint lithography (NIL) for the fabrication of IC and other electronic devices, the method of the invention is able to work a substrate to mirror finish over the entire surfaces in a relatively simple manner while maintaining a high accuracy of shape factor. Since the bottom and side surfaces of the recess, channel or step are polished at individual polishing rates, the quantities of stock removal on the bottom and side surfaces may be controlled while polishing for an equal duration of time. The recess, channel or step can be polished within a short duration of time while the size of the recess, channel or step and the bottom wall thickness after polishing can be accurately controlled. Even when a certain load is applied to the recess, channel or step to introduce a change in its shape, the bottom wall is robust enough to prevent breakage.

DESCRIPTION OF EMBODIMENTS

Figure 1:
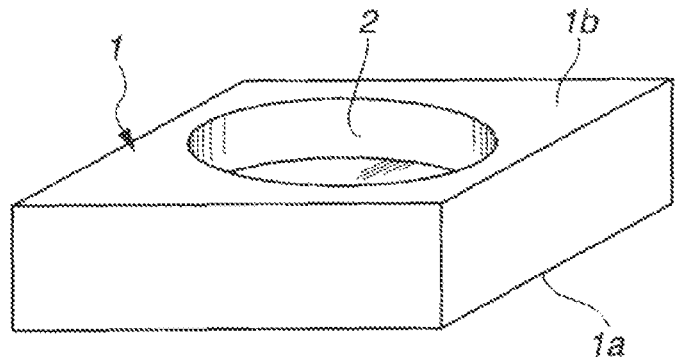
FIGS. 1 and 2 are perspective and cross-sectional views of a synthetic quartz glass substrate having a recess in one embodiment of the invention, respectively.

In the following description, like reference characters designate like or corresponding parts throughout the several views shown in the figures. The singular forms "a", "an" and "the" include plural referents unless the context clearly dictates otherwise. It is also understood that terms such as "front," "back," and the like are words of convenience and are not to be construed as limiting terms. The term "recess" refers to a bore which does not penetrate throughout the substrate in its thickness direction, that is, terminates midway with a bottom wall left while the bore may be of circular, elliptic or rectangular shape in plain view.

The invention provides a method for manufacturing an electronic grade synthetic quartz glass substrate having front and back surfaces, comprising the steps of machining a synthetic quartz glass substrate to form a recess, channel or step at a predetermined position, and polishing the bottom and side surfaces of the recess, channel or step to mirror finish while keeping a rotary polishing tool in contact with the bottom and side surfaces under independent constant pressures.

The synthetic quartz glass substrate with which the method starts may be one prepared by any well-known techniques. If desired, the substrate may have a chromium or similar film deposited on its surface or a nano-structured pattern formed on its surface.

The shape of the synthetic quartz glass substrate may be rectangular or circular. The size of the synthetic quartz glass substrate may vary over a wide range covering from small-size substrates for IC photomasks or NIL molds to large-size photomask substrates for large-size liquid crystal displays. For example, rectangular shape glass substrates may range from a size of 20 mm×20 mm to a size of 152 mm×152 mm, and even to a size of 1,000 mm×2,000 mm. For circular shape glass substrates, a wafer size having a diameter of 6 inches or 8 inches is preferably used.

Although the thickness of the substrate between the front and back surfaces may vary over a wide range, the substrate thickness is preferably 0.1 to 300 mm, more preferably 0.1 to 100 mm, and even more preferably 0.2 to 30 mm.

If necessary and preferably, the synthetic quartz glass substrate is previously measured for flatness and parallelism for confirming the dimensional accuracy thereof. Measurement of flatness is preferably conducted, from the standpoint of measurement accuracy, by the optical interference method of directing coherent light, typically laser light to a substrate surface where it is reflected so that a difference in height of the substrate surface is observed as a phase shift of reflected light. Flatness may be measured using an interferometer Zygo Mark IVxp by Zygo Corporation, for example. Parallelism may also be measured by the same instrument.

It is preferred from the standpoint of pattern uniformity that the synthetic quartz glass substrate prior to the machining step to form a recess, channel or step have a flatness of 0.01 to 30 μm, more preferably 0.01 to 2 μm, and even more preferably 0.01 to 0.5 μm on its front and back surfaces. Also preferably the substrate has a parallelism of 0.1 to 50 μm, more preferably 0.1 to 5 μm, and even more preferably 0.1 to 3 μm between its front and back surfaces.

Figure 2:
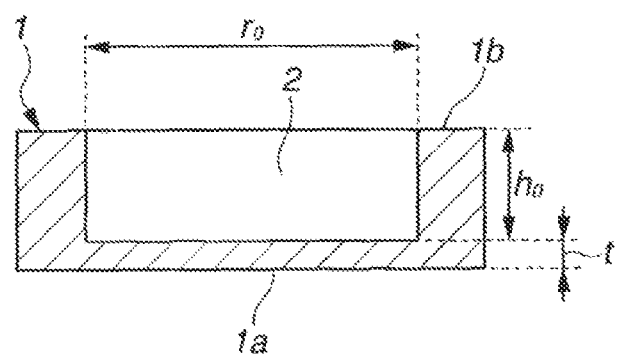
Figure 3:
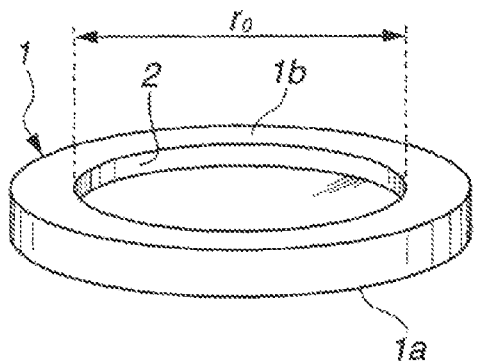
FIG. 3 is a perspective view of a synthetic quartz glass substrate having a recess in another embodiment of the invention.
Figure 4:
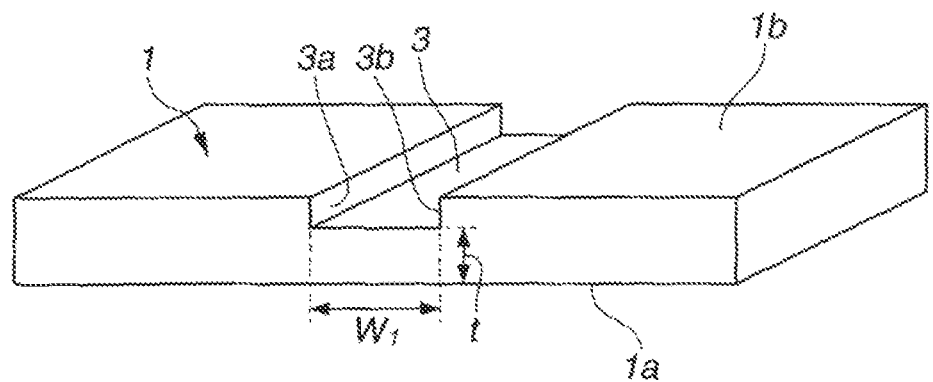
FIG. 4 is a perspective view of a synthetic quartz glass substrate having a channel in one embodiment of the invention.

The invention relates to a method for manufacturing an electronic grade synthetic quartz glass substrate wherein the glass substrate is provided with a recess as shown in FIGS. 1 and 2, a channel as shown in FIG. 3, or steps as shown in FIG. 4, depending on a particular application and the structure of an exposure or NIL equipment in which it is incorporated. In FIGS. 1 to 4, a synthetic quartz glass substrate 1 has a front surface 1a and a back surface 1b. The substrate 1 is provided in its back surface 1b with a recess 2 having a bottom surface and a side surface (FIGS. 1 and 2), a channel 3 having a bottom surface and side surfaces (FIG. 3), or steps 4 each having a bottom surface and a side surface (FIG. 4). The portion of the substrate which is left after the recess, channel or step is formed (as apparent from the cross-sectional view of FIG. 2) is referred to as "bottom wall."

More specifically, in FIGS. 1 and 2, a recess 2 is formed at the center of a rectangular substrate 1. In FIG. 3, a recess 2 is formed at the center of a circular substrate. In this case, the recess 2 is often formed in the back surface 1b of the substrate 1, and the photomask or nanoimprint working process is applied to the front surface 1a of the substrate 1.

In FIG. 4, a channel 3 is formed along the width direction at the center portion of the back surface 1b of the rectangular substrate 1.

Figure 5:
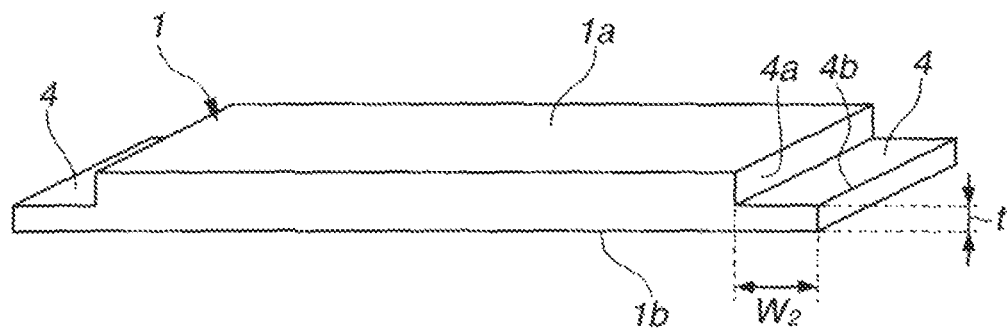
FIG. 5 is a perspective view of a synthetic quartz glass substrate having steps in one embodiment of the invention.
Figure 6:
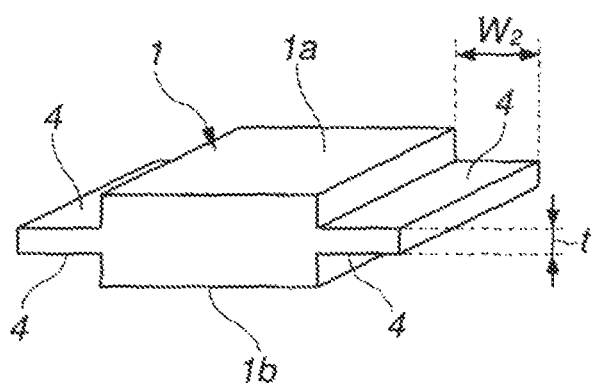
FIG. 6 is a perspective view of a synthetic quartz glass substrate having steps in another embodiment of the invention.
Figure 7:
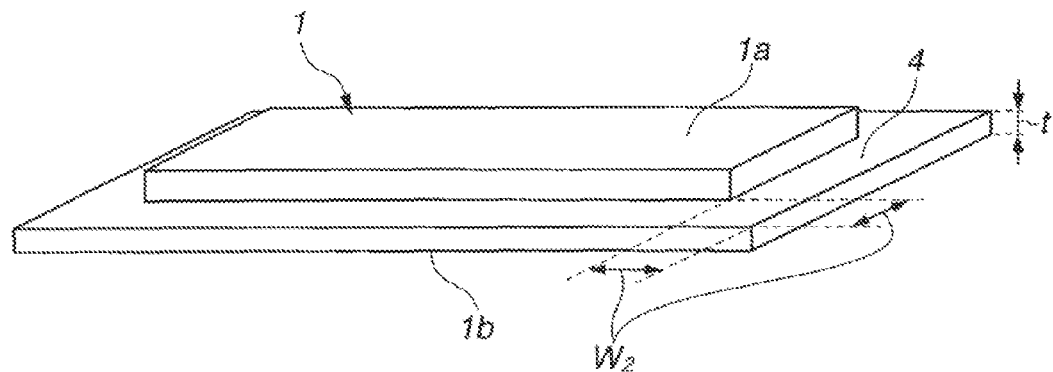
FIG. 7 is a perspective view of a synthetic quartz glass substrate having a step in a further embodiment of the invention.
Figure 8:
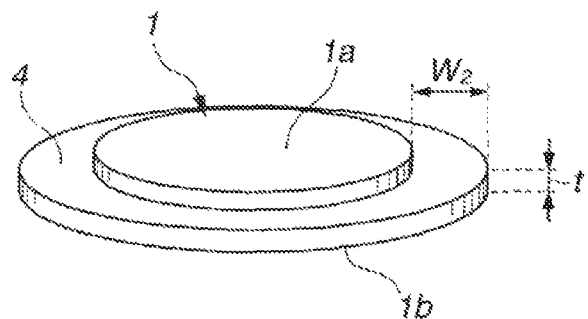
FIG. 8 is a perspective view of a synthetic quartz glass substrate having a step in a still further embodiment of the invention.

In FIG. 5, steps 4 are formed at both end portions of the front surface 1a of the rectangular substrate 1. The steps may be formed in the back surface 1b of the substrate 1, and the steps 4 also may be formed at both end portions of the front surface 1a and the back surface 1b of the substrate, as shown in FIG. 6. The step 4 may be formed along the whole peripheral edge, as shown in FIGS. 7 and 8. In FIG. 7, the step 4 is formed in the periphery of the rectangular substrate 1. In FIG. 8, the step 4 is formed in the periphery of the circular substrate 1. The step 4 is formed in the front surface 1a of the substrate 1 in FIGS. 7 and 8, although the step may be formed in the back surface of the substrate.

At least two of the recess, channel and step may be formed in one surface of the substrate. Any one of the recess, channel and step may be formed in one surface of the substrate, and the different one is formed in another surface of the substrate.

The shape of the recess may be circular, elliptic, oval, square or multilateral in plain view, although the shape of the recess is preferably circular as is shown in FIGS. 2 and 3. The size of the recess, more specifically the diameter in case of the circular recess, the major axis in case of the elliptic or oval recess, and the diagonal length in case of the square or multilateral recess, is preferably in a range of 5 to 200 mm. The channel is preferably formed so that the both side walls 3a and 3b are parallel each other and are plain, although the both side walls may not be parallel or one or both of the side walls 3a and 3b may be a projectively or retractively curved surface. The step is preferably formed so that the inside wall 4a is parallel to the end surface of the substrate including the free outer edge 4b of the step 4 and is plain, although the inside wall 4a may not be parallel to the above-said end surface or may be a projectively or retractively curved surface. The width (the longest width) is preferably in a range of 5 to 200 mm.

The depth of recess 2, channel 3 and step 4 may be selected as appropriate depending on a particular application. It is preferred for strength that the thickness ("t" in FIGS. 2, 3 and 4) of the bottom wall be 0.05 to 80 mm, more preferably 0.05 to 29 mm, and even more preferably 0.05 to 11 mm, and correspond to 1 to 90%, more preferably 5 to 50%, and even more preferably 10 to 30% of the thickness of substrate 1.

In the event the substrate is used in the NIL, the recess 2 or channel 3 is formed in the back surface 1b of substrate 1 while the front surface 1a of substrate 1 opposed to the back surface 1b is provided with a nano-structured pattern for nano-imprinting. The steps 4 are formed in the front surface and/or the back surface while the front surface is provided with a nano-structured pattern for nano-imprinting.

In the first step of machining a synthetic quartz glass substrate to form a recess, channel or step therein, a machining center or numerically controlled machine tool may be used. A grinding wheel is rotated and moved on a substrate surface to be worked under conditions that may not cause any crack, flaw or chips whereby a recess, channel or step of predetermined size and depth is formed.

Specifically, a grinding wheel having diamond or CBN abrasives electroplated or metal bonded is used and operated at a spindle rotational frequency of 100 to 30,000 rpm, preferably 1,000 to 15,000 rpm and a cutting speed of 1 to 10,000 mm/min, preferably 10 to 1,000 mm/min.

The grinding wheel and machining conditions are preferably selected such that when a recess, channel or step is formed by machining, the bottom and side surfaces of the recess, channel or step may have a surface roughness Ra of 2 to 500 nm, more preferably 2 to 100 nm. Further preferably the bottom surface has a parallelism of up to 90 μm, even more preferably 1 to 40 μm and a flatness of 0.01 to 20 μm, even more preferably 0.01 to 10 μm.

The subsequent step of polishing the machined surface, that is, the bottom and side surfaces of the recess, channel or step to mirror finish is carried out by contacting a working portion of a rotary polishing tool with the bottom and side surfaces under independent constant pressures and relatively moving the tool at a constant speed. By polishing at a constant pressure and a constant speed, the machined surface can be uniformly polished at a constant polishing rate. Specifically, the pressure under which a working portion of a rotary polishing tool is kept in contact with the machined surface is preferably in a range of 1 to 1,000,000 Pa, more preferably 1,000 to 100,000 Pa, from the standpoints of economy and ease of control.

Also from the standpoints of economy and ease of control, the polishing speed is preferably in a range of 1 to 10,000 mm/min, more preferably 10 to 1,000 mm/min. The moving quantity may be determined in accordance with the shape and size of the glass substrate.

The rotary polishing tool may be of any type as long as its working portion is an abrasive rotary component. Examples include a spindle having a tool chucking portion or a precision grinder having a polishing tool mounted thereon (e.g., Leutor).

The type of material used in the polishing tool is not particularly limited as long as the working portion is a green silicon carbide (GC) wheel, white fused alumina (WA) wheel, diamond wheel, cerium wheel, cerium pad, rubber wheel, felt buff, polyurethane or other component capable of working and removing workpiece stock.

Figure 9:
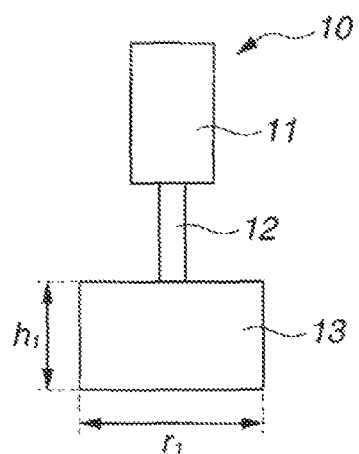
FIG. 9 is a schematic view of one exemplary rotary polishing tool.

The working portion of the rotary polishing tool may have any shape including circular or doughnut flat plate, cylinder, bombshell, disk and barrel shapes. For example, FIG. 5 shows an exemplary polishing tool 10 comprising a piston 11, a rotating shaft 12 received for axial motion in the piston 11 and rotated by a rotational drive, typically motor, and a working portion 13 attached to the end of the shaft. In order to polish the bottom and side surfaces of the recess, channel or step at the same time, the height ($h_1$ in FIG. 5) of the working portion 13 in contact with the side surface should preferably be equal to or more than the height ($h_0$ in FIG. 2) of the side surface. Likewise, the diameter ($r_1$ in FIG. 9) of the working portion 13 should preferably be equal to or more than half of the diameter ($r_0$ FIG. 2) of the recess (i.e., $r_1 \geq r_0/2$) if the recess is circular, or half of the minor diameter of the recess if the recess is elliptic or oval. The diameter $r_1$ is preferably equal to or more than half of the width ($W_1$ in FIG. 3) in case of the channel (i.e., $r_1 \geq W_1/2$). The diameter $r_1$ is preferably equal to or more than the width ($W_2$ in FIG. 4) in case of the step (i.e., $r_1 \geq W_2$).

When the recess, channel or step is polished by the rotary polishing tool with its working portion in contact with the machined surfaces (bottom and side surfaces), a polishing abrasive slurry is preferably delivered to the polishing site. Examples of suitable abrasive grains used herein include silica, ceria, Alundum, white Alundum (WA), emery, zirconia, SiC, diamond, titania, and germania. The grain size is preferably in a range of 10 nm to 10 μm. A water slurry of such abrasives may be used.

The relative moving speed of the rotary polishing tool is not particularly limited although it is preferably selected in the range of 1 to 10,000 mm/min, more preferably 10 to 1,000 mm/min. The rotational frequency of the working portion of the rotary polishing tool is preferably in the range of 100 to 10,000 rpm, more preferably 1,000 to 8,000 rpm, and even more preferably 2,000 to 7,000 rpm. A lower rotational frequency may lead to a lower polishing rate, taking a too long time until the machined surface is mirror finished. A higher rotational frequency may lead to a higher polishing rate or excessive abrasion of the working portion, causing difficult control of mirror finishing.

When the bottom and side surfaces of the recess, channel or step are polished to mirror finish according to the inventive method, independent pressure control mechanisms may be used for keeping the working portion of the rotary polishing tool in contact with the bottom and side surfaces under independent constant pressures. The pressure control mechanism used herein may be a pneumatic piston or load cell. In the case of the rotary polishing tool of FIG. 9, for example, the pressure of contact between the working portion and the bottom surface can be adjusted by adjusting the pressure of the pneumatic piston 11. Also, in the case of the rotary polishing tool of FIG. 9, a second piston may be coupled to the pneumatic piston 11 for moving the piston 11 toward and away from the side surface of the recess, channel or step. Then the pressure of contact between the working portion and the side surface can be adjusted by adjusting the pressure of the second piston. An alternative system for adjusting the pressure of contact between the working portion and the side surface includes another piston having a shaft and a substrate-holding platform for holding the substrate, with the shaft of the other piston being coupled to the platform, whereby the pressure of the shaft is adjusted to adjust a lateral pressure for controlling the motion of the substrate-holding platform. By using a single rotary polishing tool and independent pressure control mechanisms to the bottom and side surfaces, bringing the working portion in contact with the bottom and side surfaces under independent constant pressures, and relatively moving the tool at a constant speed, the bottom and side surfaces can be concurrently polished uniformly at independent polishing rates.

It may be contemplated that the bottom and side surfaces of the recess, channel or step are polished separately in succession rather than concurrently. However, this procedure is less desired in that since the working portion of the rotary polishing tool in contact with the bottom or side surface can come in contact with the side or bottom surface at the same time, the polishing of these surfaces becomes non-uniform, and a longer polishing time is necessary.

According to one embodiment of the method of the invention, in the step of polishing the bottom and side surfaces to mirror finish, the rotary polishing tool and the substrate are relatively moved such that the working portion may follow the profile of the recess, channel or step in the substrate. The mode of movement may be of any type as long as it can control the quantity, direction and speed of movement constant. For example, a multi-axis robot may be used.

The rotary polishing tool and the substrate may be relatively moved by rotating the rotary polishing tool about the recess or rotating the substrate or by moving the rotary polishing tool or the substrate along at least one straight axis, such that the working portion may follow the profile of the recess, channel or step.

In the embodiment wherein the surfaces of the recess, channel or step are polished to mirror finish by rotating the rotary polishing tool about the recess or rotating the substrate such that the working portion may follow the profile of the recess, channel or step, any mechanism capable of controlling the rotational frequency and speed constant may be used. For example, a motor spindle is used to rotate the rotary polishing tool or a substrate-holding platform at a frequency of 0.1 to 10,000 rpm, especially 1 to 100 rpm, and a speed of 1 to 10,000 mm/min, especially 10 to 1,000 mm/min. This embodiment is useful particularly when the bottom and side surfaces of a circular, elliptic or curved surface-like recess, channel or step are uniformly polished at independent constant pressures and constant speeds to mirror finish.

In the other embodiment wherein the surfaces of the recess, channel or step are polished to mirror finish by moving the rotary polishing tool or the substrate along at least one straight axis such that the working portion may follow the profile of the recess, channel or step, any mechanism capable of controlling the quantity and speed of movement constant. For example, a servo motor is used to move the rotary polishing tool or a substrate-holding platform on a slider at a speed of 1 to 10,000 mm/min, especially 10 to 1,000 mm/min. This embodiment is useful particularly when the bottom and side surfaces of a rectangular or plain surface-like recess, channel or step are uniformly polished at constant pressures and constant speeds to mirror finish.

If necessary, the substrate after mirror finish polishing may be inspected for the presence of defects, flaws or cracks on the bottom surface of the recess, channel or step and any surrounding region. Any desired inspection means may be used as long as defects, flaws or cracks having a depth of at least 200 nm and a width of at least 1 μm can be detected. Suitable inspection means include visual observation under a high intensity lamp, microscopic observation, and a laser flaw detector.

After mirror finish polishing, the bottom and side surfaces of the recess, channel or step preferably have a mirror finish as demonstrated by a surface roughness Ra of up to 1 nm, more preferably up to 0.5 nm. If the bottom and side surfaces of the recess, channel or step are not mirror finished, little light may be transmitted leading to exposure failure, or contaminants may deposit thereon to obstruct transmittance of light or detrimentally affect the pattern. It is noted that the surface roughness Ra is determined according to JIS B-0601.

Now that the bottom and side surfaces of the recess, channel or step have been polished to mirror finish, the substrate is not broken even when a load in a certain range is applied to the bottom surface of the recess, channel or step to introduce a change in the shape of the bottom surface. Specifically the bottom surface does not fail upon receipt of a stress of up to 100 $MNm^{-2}$, more specifically 5 to 50 $MN^{-2}$, and even more specifically 5 to 20 $MNm^{-2}$. Even when such loads are repeatedly applied, the bottom surface remains durable and undergoes no breakage.

The term "load in a certain range" refers, in the case of a circular recess having a bottom wall thickness of h (mm) and a diameter of a (mm), for example, to a uniformly distributed load of up to about $1.3 \times 10^8 \times h^2/a^2$ Pa, more specifically $7.0 \times 10^6 \times h^2/a^2$ to $7.0 \times 10^7 \times h^2/a^2$ Pa, and even more specifically $7.0 \times 10^6 \times h^2/a^2$ to $3.0 \times 10^7 \times h^2/a^2$ Pa, across the overall bottom surface. When such a load is applied, the bottom surface receives a stress of up to 100 $MNm^{-2}$. Likewise, in the case of a channel having a bottom wall thickness of h (mm), a width of a (mm), and a length of b (mm) and extending parallel to the end surface of the substrate, when a concentrated load of up to about $30 \times b/a \times h^2$ N, more specifically $1 \times b/a \times h^2$ to $15 \times b/a \times h^2$ N, and even more specifically $1 \times b/a \times h^2$ to $6 \times b/a \times h^2$ N is applied to the channel bottom surface at the center, the bottom surface receives a stress of up to 100 $MNm^{-2}$. In the case of a step having a bottom wall thickness of h (mm), a width of a (mm), and a length of b (mm) wherein b>3a and extending parallel to the end surface of the substrate, when a concentrated load of up to about $32 \times h^2$ N, more specifically $1 \times h^2$ to $16 \times h^2$ N, and even more specifically $1 \times h^2$ to $6 \times h^2$ N is applied to the step bottom surface at the center of the free outer edge 46, the bottom surface receives a stress of up to 100 $MNm^{-2}$. A uniformly distributed load can be applied to the recess bottom surface by an experimental pneumatic or hydraulic press capable of applying a selected positive or negative pressure over a selected number of cycles. A concentrated load can be applied to the bottom surface at the predetermined position by an experimental pressure applicator having a pointed bar or probe and capable of applying a selected pressure over a selected number of cycles.

It is preferred from the aspect of clamping the substrate that the bottom surface of the recess, channel or step which has been polished to mirror finish have a flatness of 0.01 to 40 μm, more preferably 0.01 to 10 μm, and even more preferably 0.01 to 5 μm. A poor flatness outside the range may make it difficult to hold the substrate accurately parallel to the reference when the substrate is mounted in an exposure or patterning apparatus by clamping the substrate at the bottom surface of the recess, channel or step. A poor flatness also has the problem that a fluid (gas or liquid) may not flow smoothly when the fluid is fed in or out through the recess, channel or step.

It is preferred from the standpoint of a pattern shift that the parallelism between the substrate front surface and the bottom surface of the recess, channel or step be up to 100 μm, more preferably up to 50 μm, and even more preferably up to 10 μm. If the bottom surface parallelism is poor, it becomes difficult to deform the substrate symmetrically when a resin is imprinted by deforming the substrate at the recess, channel or step and also to hold the substrate accurately parallel to the reference when the substrate is mounted in a patterning apparatus by clamping the substrate at the bottom surface of the recess, channel or step, leaving the risk of a focal shift or pattern shift.

A flatness and parallelism within the above-defined ranges may be achieved by polishing the bottom and side surfaces of the recess, channel or step in the substrate under independent constant pressures and constant speeds according to the mirror finish polishing method. By the mirror finish polishing, the bottom and side surfaces are given a surface roughness Ra which is significantly improved over that prior to the mirror finish polishing. Since the lower face of the working portion of the polishing tool has a higher polishing rate at the outside than at the center, that is, a distribution of polishing rate, it is difficult to polish the overall bottom surface of the recess, channel or step uniformly at an identical polishing rate. For this reason, the bottom surface of the recess, channel or step usually has a poorer flatness and parallelism after the mirror finish polishing than prior to the mirror finish polishing. The inventive method keeps the flatness and parallelism of the bottom surface within the above-defined ranges and avoids further aggravation of flatness and parallelism.

EXAMPLE

Examples of the invention are given below by way of illustration and not by way of limitation.

Example 1

A synthetic quartz glass substrate A dimensioned 100 mm×100 mm×6.35 mm (thick) having front, back and end surfaces polished to mirror finish was prepared as a starting substrate. Using a machining center and a diamond abrasive wheel, the starting substrate was machined at the center of its back surface to form a circular recess having a depth of 5.32 mm and a diameter of 69.98 mm.

Next, the machined substrate was fixedly mounted on a platform. A wool felt buff having a diameter of 35 mm and a height of 30 mm adapted to rotate at 1,000 rpm was forced in contact with the bottom surface of the recess under 3,500 Pa and the side surface under 2,000 Pa. The substrate-holding platform was rotated at 10 rpm, whereby the surfaces were polished for 60 minutes to mirror finish. The recess in the glass substrate as polished had a depth of 5.35 mm with a bottom wall thickness of 1.00 mm, and a diameter of 70 mm.

The mirror finished glass substrate A was measured for parallelism, flatness of front and back surfaces, and surface roughness Ra of front, back and end surfaces.

| Parallelism | | 0.6 μm |
|---|---|---|
| Front surface | flatness | 0.183 μm |
| | Ra | 0.15 nm |
| Back surface | flatness | 0.311 μm |
| | Ra | 0.15 nm |
| End surface | Ra | 0.95 nm |

Notably, flatness and parallelism were measured by Zygo Mark IVxP by Zygo, and Ra measured by atomic force microscopy.

The bottom surface of the recess formed in the back surface of the glass substrate A prior to mirror finish polishing was measured for parallelism, flatness, and surface roughness Ra, and the side wall of the recess measured for surface roughness Ra.

| Bottom surface | parallelism | 8 μm |
| --- | --- | --- |
| | flatness | 3 μm |
| | Ra | 6.82 nm |
| Side wall | Ra | 6.58 nm |

Notably, flatness and parallelism could not be measured by Zygo Mark IVxP by Zygo, but by a micrometer. Ra was measured by atomic force microscopy.

The bottom surface of the recess after mirror finish polishing was measured for parallelism, flatness, and surface roughness Ra, and the side wall of the recess measured for surface roughness Ra.

| Bottom surface | parallelism | 9 μm |
| --- | --- | --- |
| | flatness | 4 μm |
| | Ra | 0.25 nm |
| Side wall | Ra | 0.25 nm |

Notably, flatness and parallelism were measured by Zygo Mark IVxP by Zygo, and Ra measured by atomic force microscopy.

Likewise, fifty (50) synthetic quartz glass substrates were manufactured by machining a recess and mirror finish polishing the recess under equivalent conditions. The recesses had a depth of 5.35±0.01 mm and a diameter of 70±0.01 mm.

By visual observation under a high intensity lamp, the substrates were found to contain no cracks. A durability test was carried out on the recess by repeating 50,000 cycles, each cycle consisting of vacuuming to −15 kPa and resuming atmospheric pressure. For all 50 substrates, the bottom surface of the recess was devoid of breakage.

Before and after the durability test, a stress test was carried out on the substrate by vacuuming the recess to −50 kPa to apply a stress of about 46 MNm$^{-2}$ to the bottom surface. For all 50 substrates, the bottom surface of the recess was devoid of breakage.

Example 2

A synthetic quartz glass substrate B dimensioned 152 mm×152 mm×6.35 mm (thick) having front, back and end surfaces polished to mirror finish was prepared as a starting substrate. Using a machining center and a diamond abrasive wheel, the starting substrate was machined at the center of its back surface to form a channel having a depth of 4.98 mm, a width of 29.9 mm, and a length of 152 mm and extending parallel to the end surface.

Next, the machined substrate was fixedly mounted on a platform. A wool felt buff having a diameter of 30 mm and a height of 30 mm adapted to rotate at 1,000 rpm was forced in contact with the bottom surface of the channel under 2,000 Pa and one side wall under 2,000 Pa. The substrate-holding platform was moved back and forth at 50 mm/min over 5 strokes. With the buff forced in contact with the bottom surface and the other side wall under the same pressure, the substrate-holding platform was moved back and forth at 50 mm/min over 5 strokes. In this way, the surfaces were polished to mirror finish. The channel in the glass substrate as polished had a depth of 5 mm and a width of 30.1 mm.

The mirror finished glass substrate B was measured for parallelism, flatness of front and back surfaces, and surface roughness Ra of front, back and end surfaces.

| Parallelism | | 0.9 μm |
| --- | --- | --- |
| Front surface | flatness | 0.231 μm |
| | Ra | 0.14 nm |
| Back surface | flatness | 0.475 μm |
| | Ra | 0.15 nm |
| End surface | Ra | 0.83 nm |

The bottom surface of the channel formed in the back surface of the glass substrate B prior to mirror finish polishing was measured for parallelism, flatness, and surface roughness Ra, and the side wall of the channel measured for surface roughness Ra.

| Bottom surface | parallelism | 13 μm |
| --- | --- | --- |
| | flatness | 5 μm |
| | Ra | 7.06 nm |
| Side wall | Ra | 10.70 nm |

The bottom surface of the channel after mirror finish polishing was measured for parallelism, flatness, and surface roughness Ra, and the side wall of the channel measured for surface roughness Ra.

| Bottom surface | parallelism | 15 μm |
| --- | --- | --- |
| | flatness | 7 μm |
| | Ra | 0.45 nm |
| Side wall | Ra | 0.37 nm |

Likewise, fifty (50) synthetic quartz glass substrates were manufactured by machining a channel and mirror finish polishing the channel under equivalent conditions. The channels had a depth of 5±0.01 mm and a width of 30±0.01 mm.

By visual observation under a high intensity lamp, the substrates were found to contain no cracks. A durability test was carried out on the channel by repeating 10,000 cycles, each cycle consisting of applying a load of 10 N to the channel bottom at the center and returning the load to zero. For all 50 substrates, the bottom surface of the channel was devoid of breakage.

Before and after the durability test, a stress test was carried out on the substrate by applying a load of 50 N to produce a stress of about 20 MNm$^{-2}$ to the bottom surface at the center. For all 50 substrates, the bottom surface of the channel was devoid of breakage.

Example 3

A synthetic quartz glass substrate C dimensioned 200 mm×400 mm×10 mm (thick) having front, back and end surfaces polished to mirror finish was prepared as a starting substrate. Using a machining center and a diamond abrasive wheel, the starting substrate was machined on its back surface along both ends to form steps having a depth of 6.95 mm, a width of 19.99 mm, and a length of 200 mm.

Next, the machined substrate was fixedly mounted on a platform. A wool felt buff having a diameter of 30 mm and a height of 30 mm adapted to rotate at 1,000 rpm was forced in contact with the bottom surface of the step under 2,000 Pa and the side wall under 2,000 Pa. The substrate-holding platform was moved back and forth at 200 mm/min over 5 strokes. In this way, the surfaces of both side steps were polished to mirror finish. The step in the glass substrate as polished had a depth of 7 mm and a width of 20 mm.

The mirror finished glass substrate C was measured for parallelism, flatness of front and back surfaces, and surface roughness Ra of front, back and end surfaces.

| | | |
|---|---|---|
| Parallelism | | 5.3 μm |
| Front surface | flatness | 2.117 μm |
| | Ra | 0.11 nm |
| Back surface | flatness | 3.151 μm |
| | Ra | 0.12 nm |
| End surface | Ra | 1.13 nm |

The bottom surface of the steps formed in the back surface of the glass substrate C prior to mirror finish polishing was measured for parallelism, flatness, and surface roughness Ra, and the side wall of the steps measured for surface roughness Ra.

| | | |
|---|---|---|
| Bottom surface | parallelism | 13 μm and 17 μm |
| | flatness | 8 μm and 8 μm |
| | Ra | 11.51 nm |
| Side wall | Ra | 12.15 nm |

The bottom surface of the steps after mirror finish polishing was measured for parallelism, flatness, and surface roughness Ra, and the side wall of the steps measured for surface roughness Ra.

| | | |
|---|---|---|
| Bottom surface | parallelism | 15 μm and 19 μm |
| | flatness | 10 μm and 9 μm |
| | Ra | 0.28 nm |
| Side wall | Ra | 0.27 nm |

When steps were machined and mirror finish polished under the same conditions as above, the steps of 200 mm×20 mm had a flatness of 10 μm and 9 μm and a parallelism of 15 μm and 19 μm.

When ten (10) synthetic quartz glass substrates were similarly manufactured, the steps had a depth of 7±0.01 mm and a width of 20±0.01 mm.

By visual observation under a high intensity lamp, the substrates were found to contain no cracks. A durability test was carried out on the steps by repeating 5,000 cycles, each cycle consisting of applying a load of 20 N to the step bottom at the center of the free outer edge and returning the load to zero. For all 10 substrates, the bottom surface of the steps was devoid of breakage.

Before and after the durability test, a stress test was carried out on the substrate by applying a load of 50 N to produce a stress of about 17 $MNm^{-2}$ to the step bottom surface at the center. For all 10 substrates, the bottom surface of the step was devoid of breakage.

Comparative Example 1

As in Example 1, a synthetic quartz glass substrate A was machined to form a circular recess having a depth of 5.35 mm with a bottom wall thickness of 1.00 mm, and a diameter of 70 mm.

The bottom surface and side wall of the recess formed in the back surface of the glass substrate A were measured for surface roughness Ra by atomic force microscopy.

| | | |
|---|---|---|
| Bottom surface | Ra | 7.13 nm |
| Side wall | Ra | 8.42 nm |

When the recess in this synthetic quartz glass substrate without mirror finish polishing was vacuumed to −90 kPa, the bottom surface of the recess was broken.

Japanese Patent Application No. 2010-146507 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for manufacturing an electronic grade synthetic quartz glass substrate having front and back surfaces, comprising the steps of:
   forming a synthetic quartz glass into one substrate of the group consisting of a photomask, an exposure tool component, a reticle and a nanoimprint component,
   machining at least one surface of the synthetic quartz glass substrate to form a recess, channel or step having bottom and side surfaces, and
   polishing the bottom and side surfaces of the recess, channel or step to mirror finish by a working portion of a rotary polishing tool while keeping the working portion in contact with the bottom and side surfaces under independent constant pressures.

2. The method of claim 1 wherein the mirror finish polishing step includes keeping the working portion in contact with the bottom and side surfaces of the recess, channel or step under independent constant pressures in a range of 1 to 1,000,000 Pa.

3. The method of claim 2, wherein the mirror finish polishing step includes keeping the working portion in contact with the bottom and side surfaces of the recess, channel or step under independent constant pressures in a range of 1,000 to 100,000 Pa.

4. The method of claim 1 wherein in the mirror finish polishing step, the working portion of the rotary polishing tool is kept in concurrent contact with the bottom and side surfaces under independent pressures.

5. The method of claim 1 wherein in the mirror finish polishing step, the rotary polishing tool and the substrate are relatively moved such that the working portion may follow the profile of the recess, channel or step in the substrate.

6. The method of claim 5 wherein in the mirror finish polishing step, the rotary polishing tool is rotated about the recess or a substrate-holding platform is rotated such that the working portion may follow the profile of the recess, channel or step in the substrate.

7. The method of claim 5 wherein in the mirror finish polishing step, the rotary polishing tool or a substrate-holding platform is moved along at least one straight axis such that the working portion may follow the profile of the recess, channel or step in the substrate.

8. The method of claim 1 wherein the substrate has a thickness of 0.1 to 300 mm, and the distance between the bottom surface of the recess, channel or step in one surface of the substrate and another surface of the substrate is in a range of 0.05 to 80 mm and corresponds to 5 to 50% of the substrate thickness.

9. The method of claim 1 wherein
   the substrate on its front and back surfaces has a flatness of 0.01 to 30 μm and a parallelism of 0.1 to 50 μm prior to the machining step,
   the bottom and side surfaces of the recess, channel or step have a surface roughness Ra of 2 to 500 nm prior to the mirror finish polishing step, and
   the bottom surface of the recess, channel or step has a flatness of 0.01 to 40 μm and a parallelism of up to 100 μm and the bottom and side surfaces of the recess, channel or step have a surface roughness Ra of up to 1 nm, following the mirror finish polishing step.

10. The method of claim 9, wherein the bottom and side surfaces of the recess, channel or step have a surface roughness Ra of 2 to 100 nm prior to the mirror finish polishing step, a flatness of 0.01 to 10 µm, and a parallelism of 1 to 40 µm,
the bottom surface of the recess, channel or step has a flatness of 0.01 to 10 µm and a parallelism of up to 50 µm and the bottom and side surfaces of the recess, channel or step have a surface roughness Ra of up to 1 nm, following the mirror finish polishing step.

11. The method of claim 10, wherein
the bottom surface of the recess, channel or step has a flatness of 0.01 to 5 µm and a parallelism of up to 10 µm and the bottom and side surfaces of the recess, channel or step have a surface roughness Ra of up to 0.5 nm, following the mirror finish polishing step.

12. A method for manufacturing an electronic grade synthetic quartz glass substrate having front and back surfaces, comprising the steps of:

forming a synthetic quartz glass into a substrate of a nanoimprint component,
machining at least one surface of the synthetic quartz glass substrate to form a recess, channel or step having bottom and side surfaces, the bottom and side surfaces of the recess, channel or step having a surface roughness Ra of 2 to 100 nm,
polishing the bottom and side surfaces of the recess, channel or step to mirror finish to a surface roughness of up to 0.5 nm by a working portion of a rotary polishing tool while keeping the working portion in contact with the bottom and side surfaces under independent constant pressures.

13. The method of claim 12 wherein the substrate on its front and back surfaces has a flatness of 0.01 to 2 µm and a parallelism of 0.1 to 5 µm prior to the machining step, and
the bottom surface of the recess, channel or step has a flatness of 0.01 to 10 µm and a parallelism of up to 50 µm.

* * * * *